US 9,483,960 B2

(12) United States Patent
Tse

(10) Patent No.: US 9,483,960 B2
(45) Date of Patent: Nov. 1, 2016

(54) METHOD AND APPARATUS FOR DIMENSIONAL PROXIMITY SENSING FOR THE VISUALLY IMPAIRED

(71) Applicant: Xerox Corporation, Norwalk, CT (US)

(72) Inventor: Francis Kapo Tse, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 167 days.

(21) Appl. No.: 14/498,488

(22) Filed: Sep. 26, 2014

(65) Prior Publication Data
US 2016/0093234 A1  Mar. 31, 2016

(51) Int. Cl.
*G09B 21/00* (2006.01)
*G06K 9/00* (2006.01)

(52) U.S. Cl.
CPC ......... *G09B 21/006* (2013.01); *G06K 9/00201* (2013.01)

(58) Field of Classification Search
CPC ... G06T 7/0051; G06T 9/00; G06T 2200/04; G09B 21/006; H04N 13/0271; A61H 3/061; A61H 2201/5048; A61H 2201/5058; A61H 2201/5092
See application file for complete search history.

(56) References Cited

U.S. PATENT DOCUMENTS

| | | | |
|---|---|---|---|
| 6,523,006 B1* | 2/2003 | Ellis et al. ..................... | 704/270 |
| 2002/0159629 A1* | 10/2002 | Dutta et al. .................. | 382/154 |
| 2005/0208457 A1* | 9/2005 | Fink et al. .................... | 434/112 |
| 2007/0211947 A1* | 9/2007 | Tkacik .......................... | 382/232 |
| 2012/0268563 A1* | 10/2012 | Chou et al. ................... | 348/46 |
| 2015/0211858 A1* | 7/2015 | Jerauld ................. | G01C 21/00 701/541 |

\* cited by examiner

*Primary Examiner* — Andrew W Johns

(57) ABSTRACT

A method, non-transitory computer readable medium, and apparatus for providing a dimension and a proximity of an object are disclosed. For example, the method receives a three dimensional depth map expressed as a two dimensional array of gray values, rasterizes the two dimensional array of gray values into vertical scan lines and horizontal scan lines for a left speaker and a right speaker and converts the vertical scan lines and the horizontal scan lines into a double beep, wherein a first beep of the double beep represents a vertical dimension of the object, the second beep of the double beep represents a horizontal dimension of the object, an intensity of each beep of the double beep represents the proximity of the object and a frequency spectrum of the double beep represents a shape of the object.

20 Claims, 11 Drawing Sheets

METHOD AND APPARATUS FOR DIMENSIONAL PROXIMITY SENSING FOR THE VISUALLY IMPAIRED

The present disclosure relates generally to aiding the visually impaired and, more particularly, to a method and apparatus for dimensional proximity sensing for the visually impaired.

BACKGROUND

Wearable devices are being introduced by various companies and are becoming more popular in what the wearable devices can do. As the footprint for electronics becomes increasingly smaller, wearable devices may have more and more functionality.

One possible application for wearable devices could be to assist visually impaired person. Currently, visually impaired persons have no tool for real time mobility navigation to be able to walk around a city alone. For example, current tools include using a sight dog or using a walking cane to help them "feel" their surroundings.

SUMMARY

According to aspects illustrated herein, there are provided a method, a non-transitory computer readable medium, and an apparatus for providing a dimension and a proximity of an object. One disclosed feature of the embodiments is a method that receives a three dimensional depth map expressed as a two dimensional array of gray values, rasterizes the two dimensional array of gray values into vertical scan lines and horizontal scan lines for a left speaker and a right speaker and converts the vertical scan lines and the horizontal scan lines into a double beep, wherein a first beep of the double beep represents a vertical dimension of the object, the second beep of the double beep represents a horizontal dimension of the object, an intensity of each beep of the double beep represents the proximity of the object and a frequency spectrum of the double beep represents a shape of the object.

Another disclosed feature of the embodiments is a non-transitory computer-readable medium having stored thereon a plurality of instructions, the plurality of instructions including instructions which, when executed by a processor, cause the processor to perform an operation that receives a three dimensional depth map expressed as a two dimensional array of gray values, rasterizes the two dimensional array of gray values into vertical scan lines and horizontal scan lines for a left speaker and a right speaker and converts the vertical scan lines and the horizontal scan lines into a double beep, wherein a first beep of the double beep represents a vertical dimension of the object, the second beep of the double beep represents a horizontal dimension of the object, an intensity of each beep of the double beep represents the proximity of the object and a frequency spectrum of the double beep represents a shape of the object.

Another disclosed feature of the embodiments is an apparatus comprising a pair of glasses for providing a dimension and a proximity of an object. In one embodiment, the pair of glasses comprises a time of flight camera for generating a three dimensional depth map, a left speaker, a right speaker and a processor coupled to the time of flight camera for converting the three dimensional depth map into a two dimensional array of gray values, rasterizing the two dimensional array of gray values into vertical scan lines and horizontal scan lines for the left speaker and the right speaker and converting the vertical scan lines and the horizontal scan lines into a left side double beep outputted by the left speaker and a right side double beep outputted by the right speaker, wherein a first beep of the left side double beep and the right side double beep represents a vertical dimension of the object, the second beep of the left side double beep and the right side double beep represents a horizontal dimension of the object, an intensity of each beep of the left side double beep and the right side double beep represents the proximity of the object and a frequency spectrum of a series of left side double beeps and a series of right side double beeps represents a shape of the object.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, non-transitory computer-readable medium and an apparatus for providing a dimension and a proximity of an object to a visually impaired person. Currently, visually impaired persons have no tool for real time mobility navigation to be able to walk around a city alone.

Embodiments of the present disclosure use a wearable device to convert images into sounds such that a visually impaired person can "visualize" an object by the sounds that are presented to the visually impaired person. For example, an intensity or a level of volume of a sound may represent a proximity to the object, a difference in two consecutive sounds or a frequency spectrum can provide dimensions of the object, a frequency between sounds can represent movement of an object, and the like. As a result, the embodiments of the present disclosure may enable or help a visually impaired person to walk freely by themselves.

In one embodiment, the embodiments of the present disclosure may also be used for night time applications. For example, the wearable device of the present disclosure may be used by individuals who can see, but are traversing a dark environment, in the evening or any other low light condition.

Figure 1:
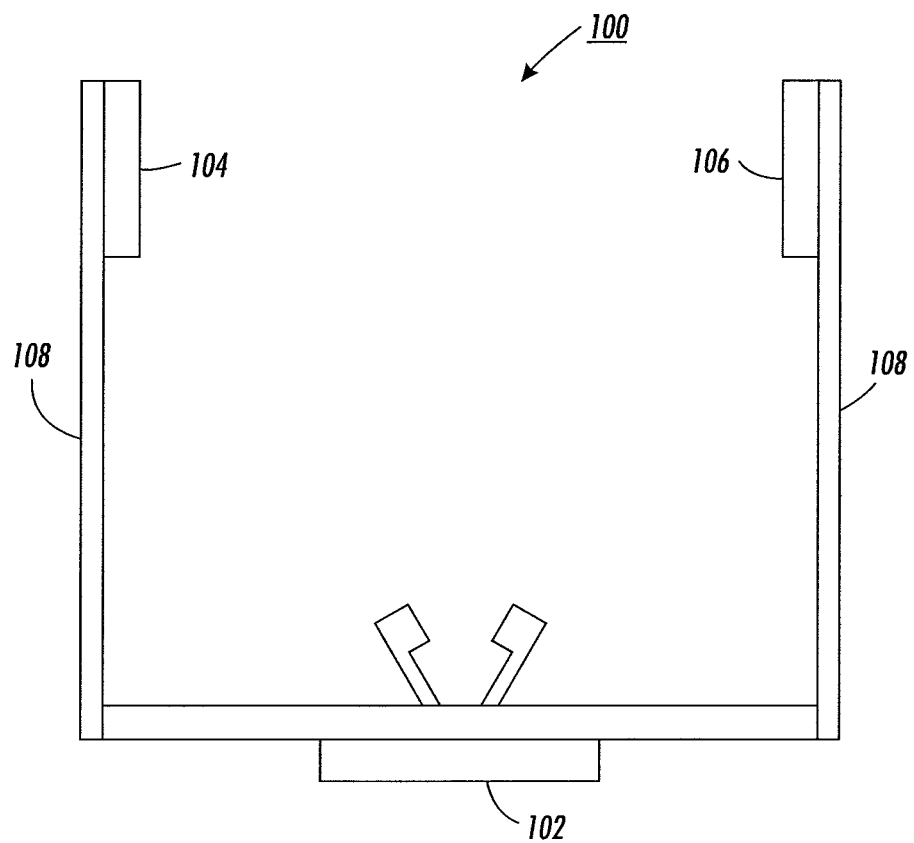
FIG. 1 illustrates a block diagram of an example pair of glasses for dimensional proximity sensing of the present disclosure.

FIG. 1 illustrates an example of a wearable device 100 of the present disclosure. In one embodiment, the wearable device 100 may be a pair of glasses or eyeglasses (also referred to herein as glasses 100).

Figure 5:
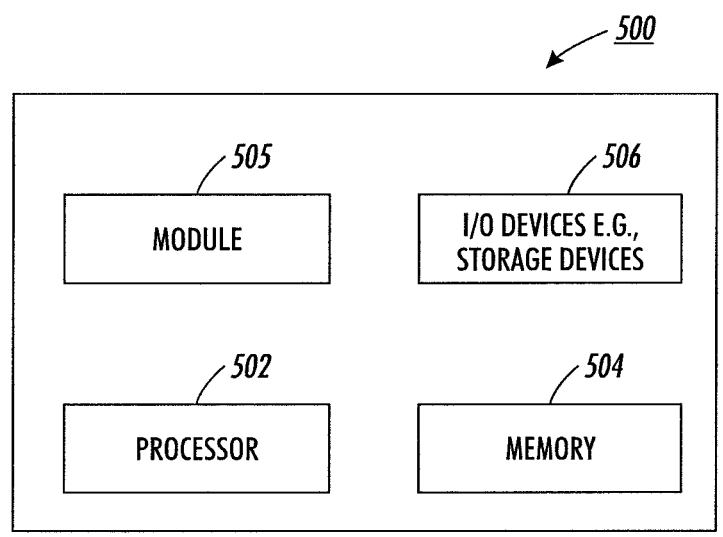
FIG. 5 illustrates a high-level block diagram of a general-purpose computer suitable for use in performing the functions described herein.

In one embodiment, the wearable device 100 may have a time of flight (TOF) camera 102, a right ear speaker 104 and a left ear speaker 106. The wearable device 100 may also include general components of a computing device such as a processor and a memory as illustrated in FIG. 5 and discussed below. For example, the processor and the memory may be located in the arms 108 of the glasses 100.

In one embodiment, TOF camera 102 may be located on a center portion of the glasses between a person's eyes. As a result, the TOF camera 102 may be directed towards a same direction as the person's eyes and move along with a direction of movement of the person's eyes and head.

The TOF camera 102 may create a three-dimensional (3D) depth map of an object using structured laser light. The structure light may project known patterns onto the object and inspect a pattern of distortion.

In one embodiment, the TOF camera 102 may capture a 3D depth map of an object that is closest in a field of view of the visually impaired user. For example, when a visually impaired user points the TOF camera 102 on the glasses 100 toward a field of view having many objects, the closest object in the field of view may be processed as discussed below. The 3D depth maps can be continuously captured and are referred to as individual video frames or simply frames. Each consecutive 3D depth map may represent a particular instance of object detection.

In one embodiment, the 3D depth map generated by the TOF camera 102 may be converted or expressed as a two dimensional (2D) array of gray values as illustrated in FIGS. 3A-3G. In one embodiment, to get a sense of a left side and a right side of the user, the 3D depth map may be divided into a left portion, a center portion and a right portion. Each portion may be converted into a 2D array of gray values representing a respective side, the 2D array of gray values may then be converted into different one dimensional audio signals and the audio signals may be fed separately to the left ear and the right ear of the user.

In one embodiment, the audio signals may provide an indication of proximity and dimensions of the object to the visually impaired user. For example, the 2D array of gray values may be rasterized horizontally and vertically and converted into two consecutive audio beeps fed to both the left ear and the right ear of the visually impaired user. In one embodiment, a short pause may be inserted between the audio beeps such that the visually impaired user may be able to distinguish between different consecutive sets of audio beeps.

Figure 3A:
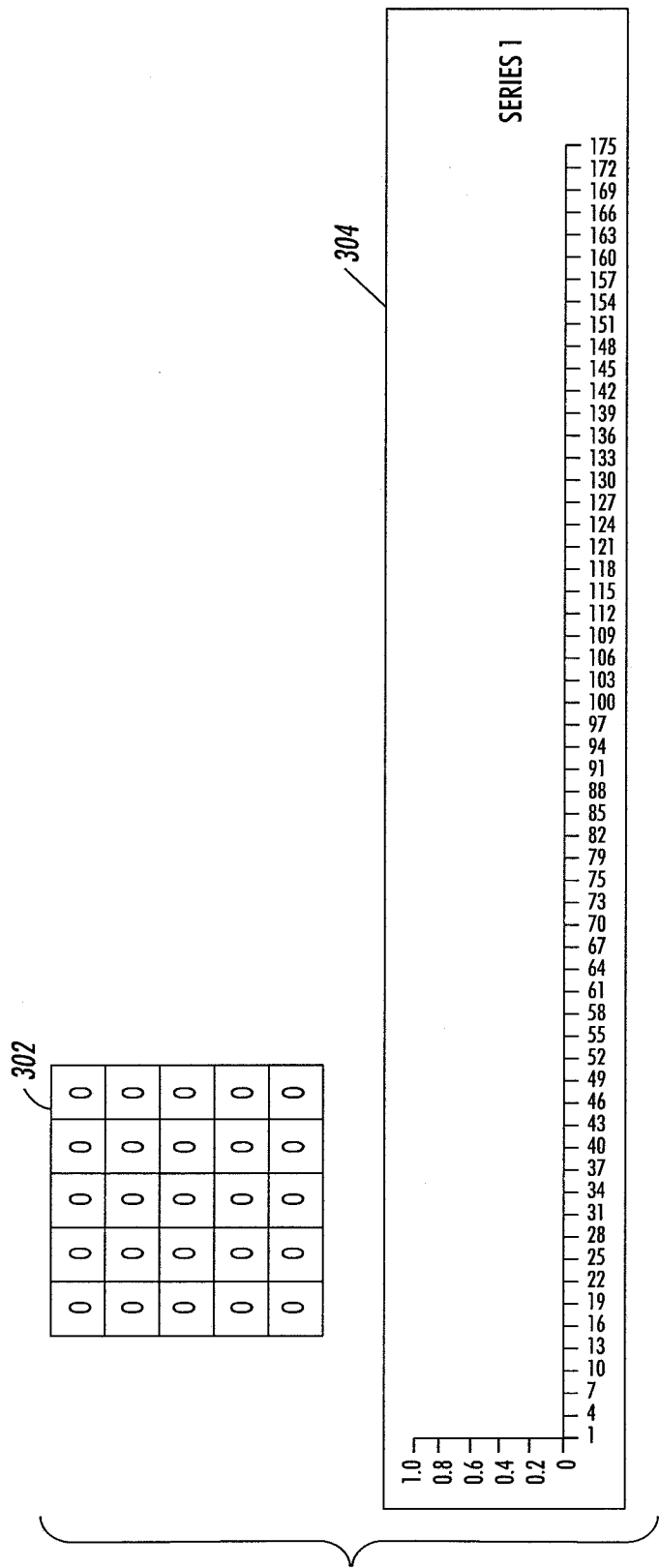
FIGS. 3A-3G illustrate examples of how two-dimensional gray values are converted into one dimensional audio signals.

For example, in FIG. 3A, the 2D array 302 is filled with zeros. In other words, no object is near. As a result, the translated one dimensional (1D) audio signal 304 is also all zeros. Thus, no audio signals would be transmitted to the user.

Figure 3B:
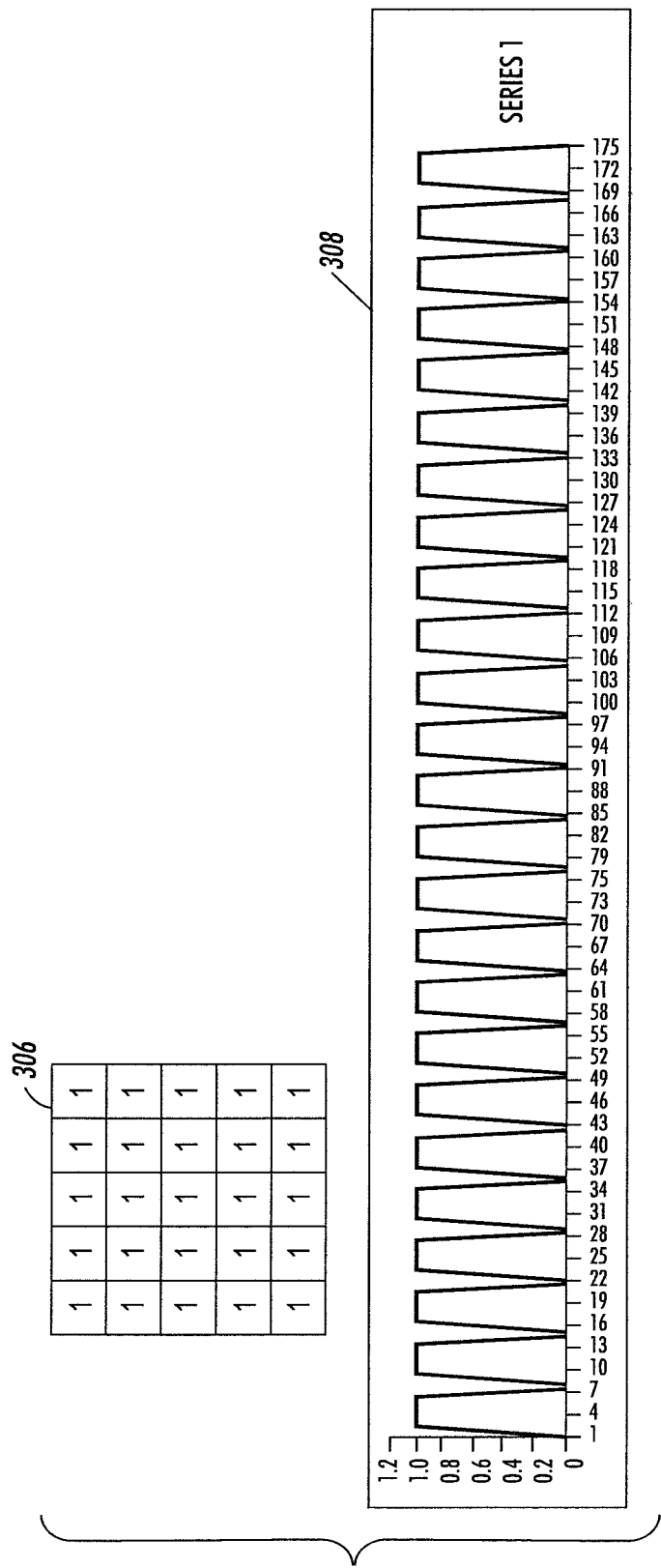

In FIG. 3B, the 2D array 306 has all ones. As a result, the 1D audio signal 308 would have continuous beeps of the same volume or intensity to indicate that the object has a continuous shape such as a wall, for example. As noted above, the 1D audio signal 308 has inserted pauses such that the visually impaired user may be able to hear each beep.

Figure 3C:
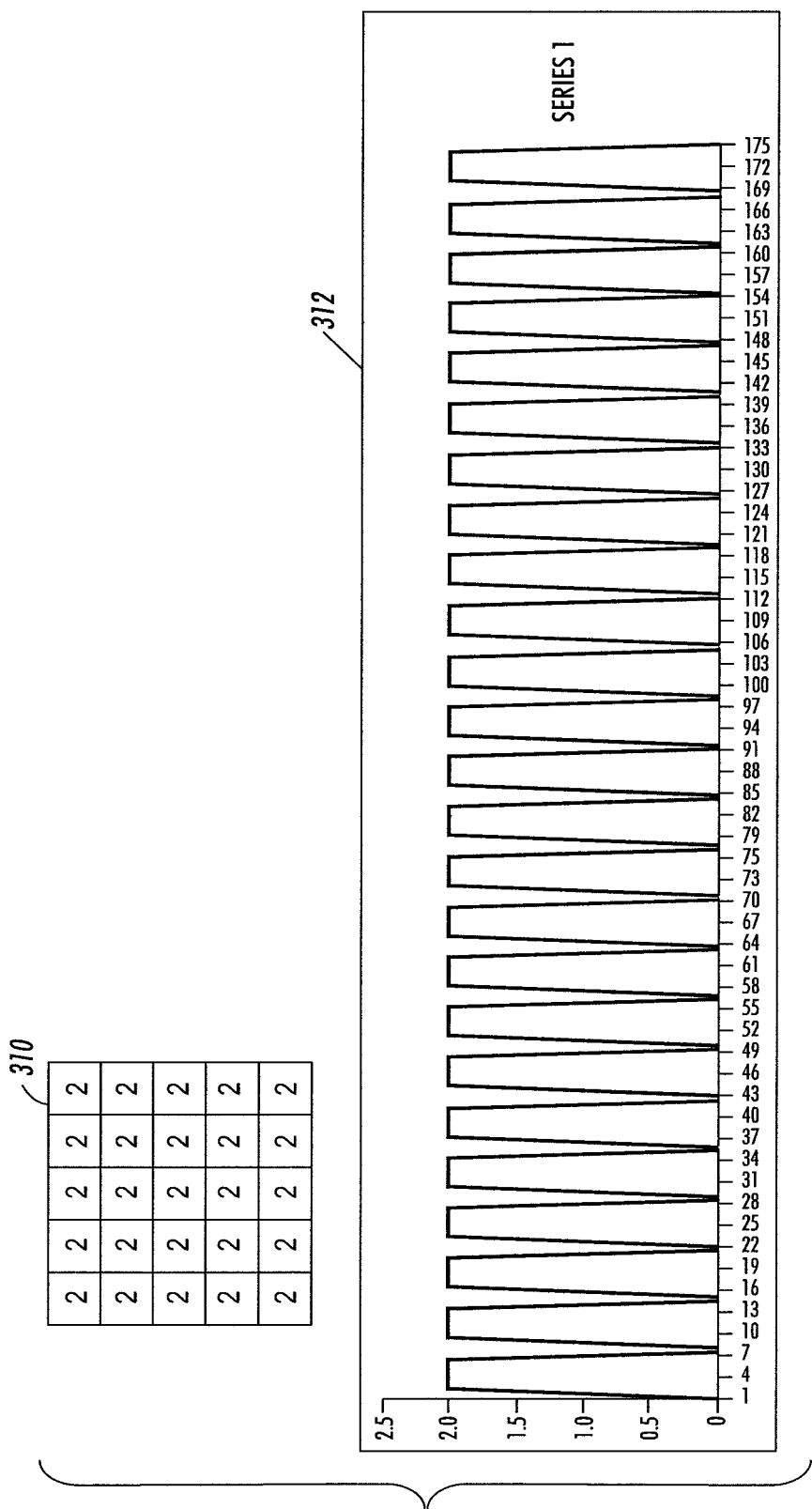

In FIG. 3C, the 2D array 310 is filled with twos. As a result, the 1D audio signal 312 would have continuous beeps having a higher volume or intensity to indicate that the object is closer than the object in the 1D audio signal 308. However, the consistency of the beeps would indicate the object has a continuous shape, such as a wall, similar to the object in the 1D audio signal 308.

Figure 3D:
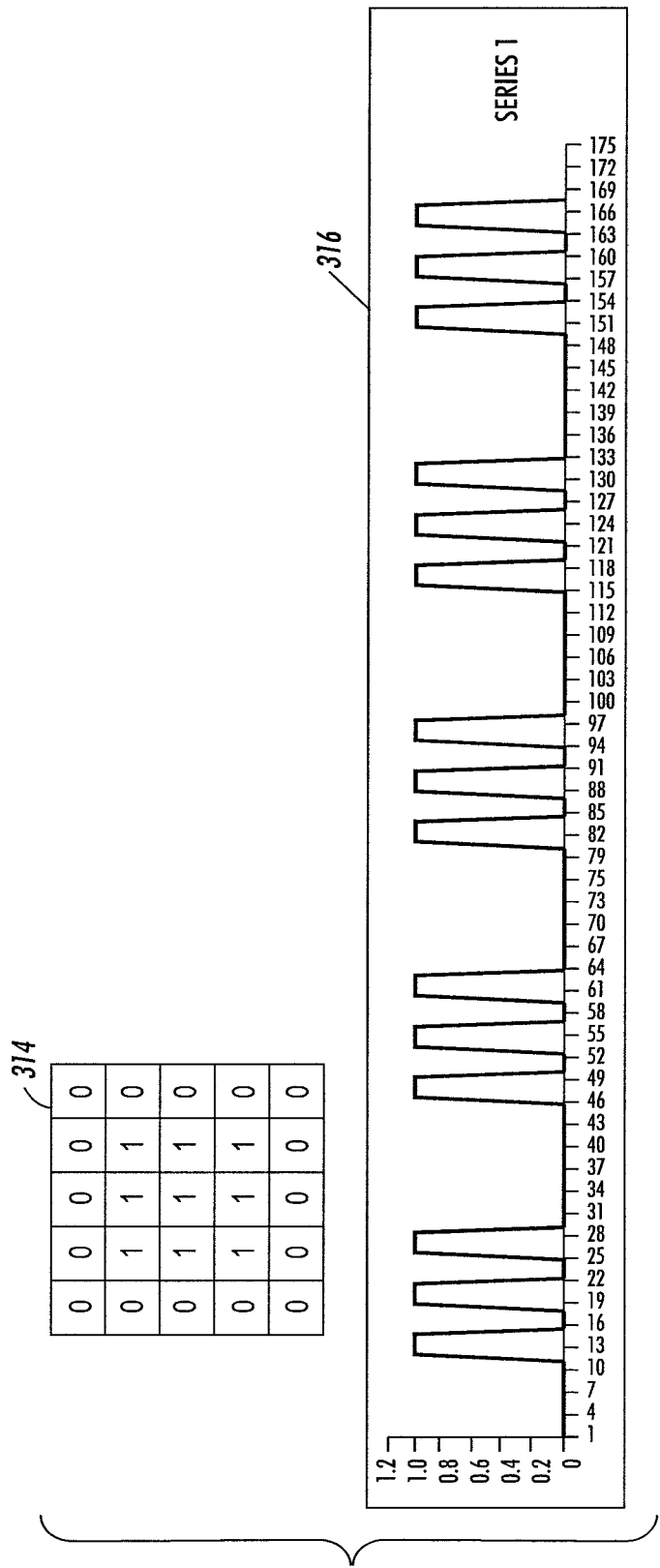

In FIG. 3D, the 2D array 314 is filled with ones in a center of the 2D array 314. As a result, the 1D audio signal 316 would have intermittent beeps of the same volume or intensity to indicate that the object has a symmetrical shape or a square shape.

Figure 3E:
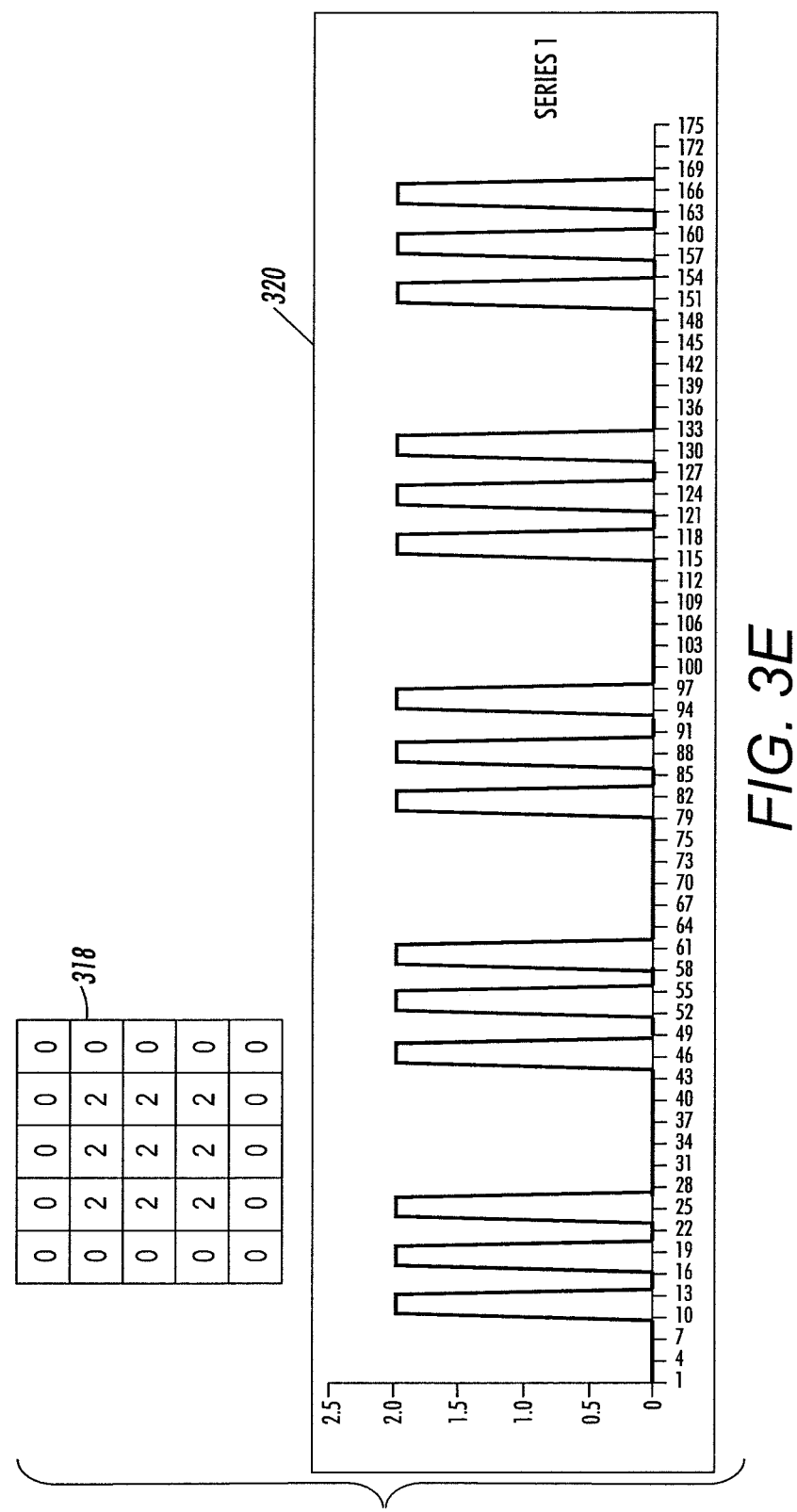

In FIG. 3E, the 2D array 318 is filled with twos in a center of the 2D array 318. As a result, the 1D audio signal 320 would have intermittent beeps having a higher volume or intensity than the 1D audio signal 316 indicating that the square object is closer.

Figure 3F:
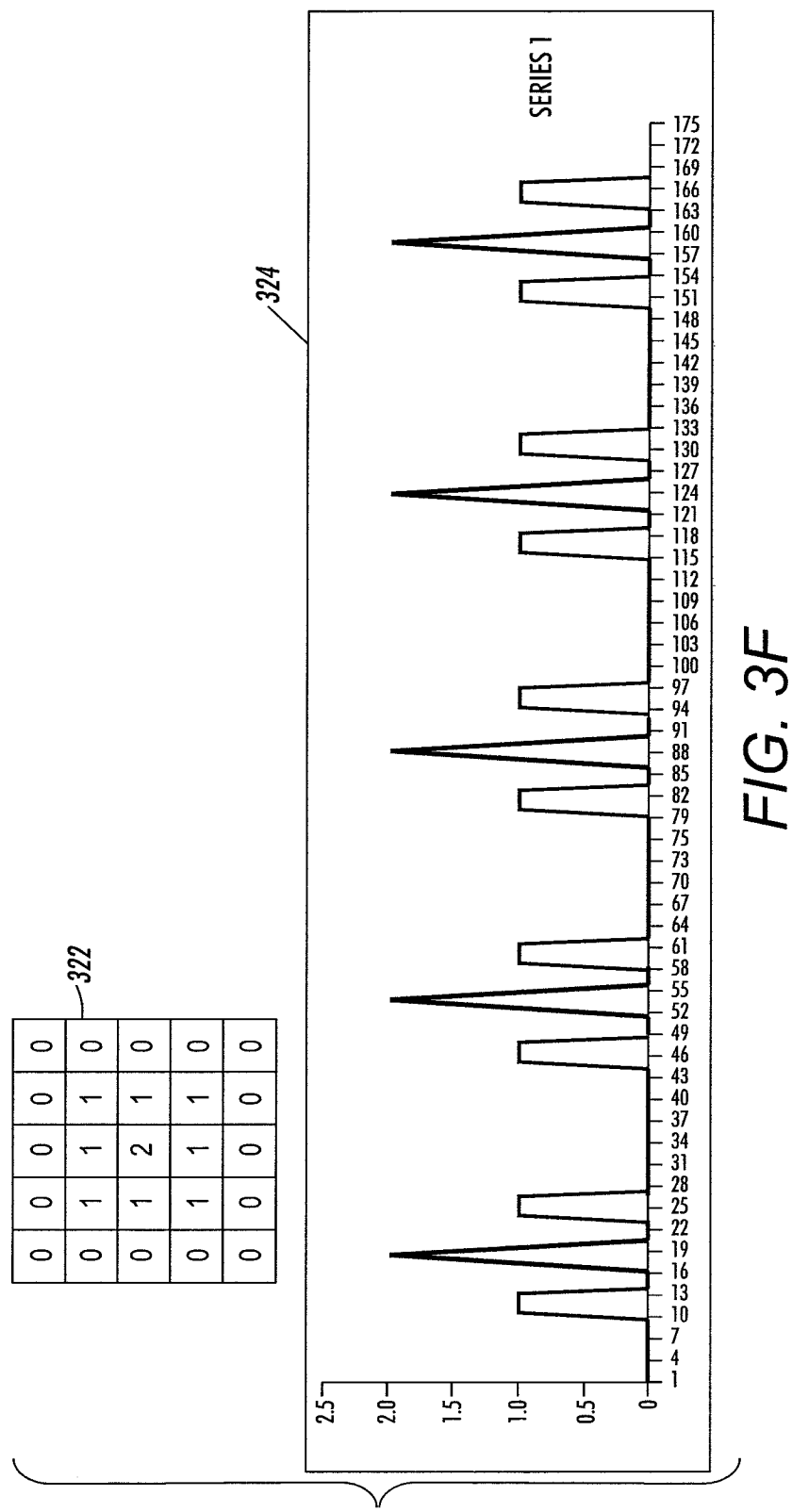

In FIG. 3F, the 2D array 322 may have a value of two in the center surrounded by a value of ones in the 2D array 322. As a result, the 1D audio signal 316 may represent an object having a pyramidal shape.

Figure 3G:
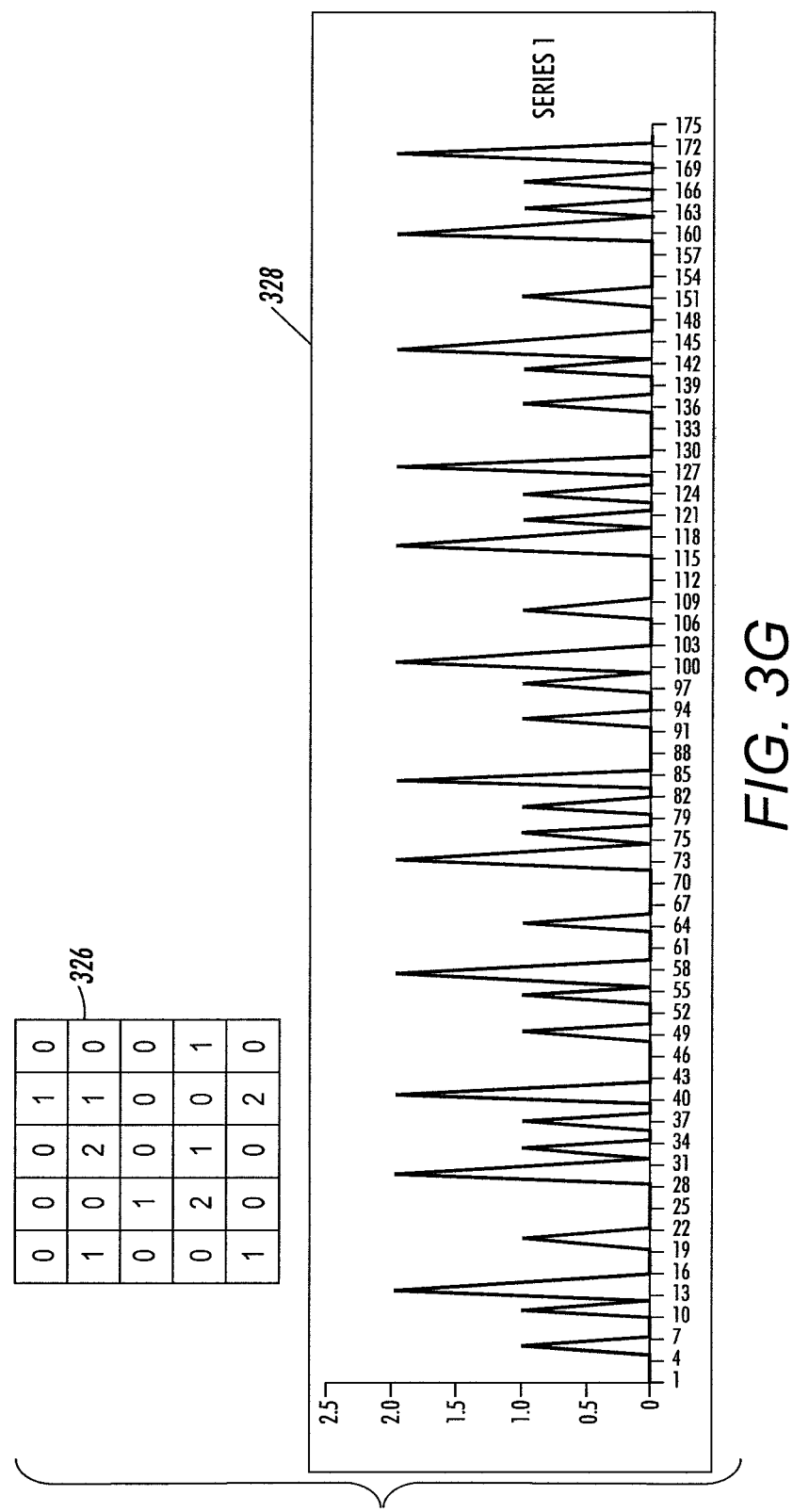

In FIG. 3G, the 2D array 326 may have a random distribution of ones and twos. As a result, the 1D audio signal 328 may represent a random shaped object, for example, gravel on the ground or a rough road surface.

In one embodiment, the 2D array of gray values in FIGS. 3A-3G may be rasterized both vertically and horizontally as noted above. Each direction may be processed as a separate series of consecutive beeps. For example, a long pole may be represented by a 2D array of gray values in a 6×6 array having a value of ones down a center column. As a result, rasterizing the 2D array of gray values vertically would result in a different 1D audio signal pattern than rasterizing the 2D array of gray values horizontally. For example, rasterizing vertically would result in a silent click sound caused by audio conversion of a spike signal in the middle of the frame. Rasterizing horizontally would result in an audio beep on each line.

As a result, when the two audio beeps are provided to the visually impaired user, the visually impaired user may hear two consecutive beeps in each ear. One beep may represent an audio translation of a first frame in the 2D array of gray values obtained by the vertical rasterization and the other beep may represent an audio translation of the first frame in the 2D array of gray values obtained by the horizontal rasterization. The two consecutive beeps may be followed by a pause and then another two consecutive beeps may be provided in each ear. The next two consecutive beeps may represent the audio translation of the second frame in the 2D array of gray values obtained by the vertical rasterization and the other beep may represent an audio translation of the second frame in the 2D array of gray values obtained by the horizontal rasterization. In one embodiment, the process frame rate may be adjusted and inter-frame processing (e.g., frame averaging or other forms of filtering) can be performed to improve the signal quality. The process may be repeated until the entire 2D array of gray values is processed.

As a result, the two consecutive beeps may provide proximity and dimensional information to the visually impaired user. For example, the volume or the intensity of the beep may provide a proximity of the object. The presence, absence or how an audio beep sounds (e.g., a frequency spectrum) may provide dimensional information (e.g., whether the object is a square, a long pole, a pyramid shape, and the like). For example, the audio beeps may have a range of different frequencies or a combination of different frequencies for consecutive beeps that can be translated by a listener to as being representative of different shapes. In addition, the two consecutive beeps coming from the left ear or the right ear may allow the visually impaired user to know if the object is on a left side or a right side, respectively, of the user.

In one embodiment, the audio information may provide indication that an object is moving. For example, as the two consecutive beeps gradually get louder and then quieter, the visually impaired user may know that an object has passed by. In other words, as an intensity of each beep of the double beeps changes over a period of time while the visually impaired person remains at a location (i.e., the user is not moving or standing still) may represent movement of the object.

In one embodiment, a unique audio beep or tone may be used to indicate to the visually impaired user that the audio signals is starting over due to a new or updated set of 2D array of gray values. For example, if the visually impaired user turns his or her head and the TOF camera 102 captures a new image before the previous images was completed processed, the unique audio beep may be played. The visually impaired user may then know that the audio signals being received is for a new object or a new perspective of the objects (e.g., audio signals in the left ear indicating the object is on a left side may be transferred to audio signals in the right ear indicating the object is now on a right side of the visually impaired user as he or she turns her head to the left).

Figure 2:
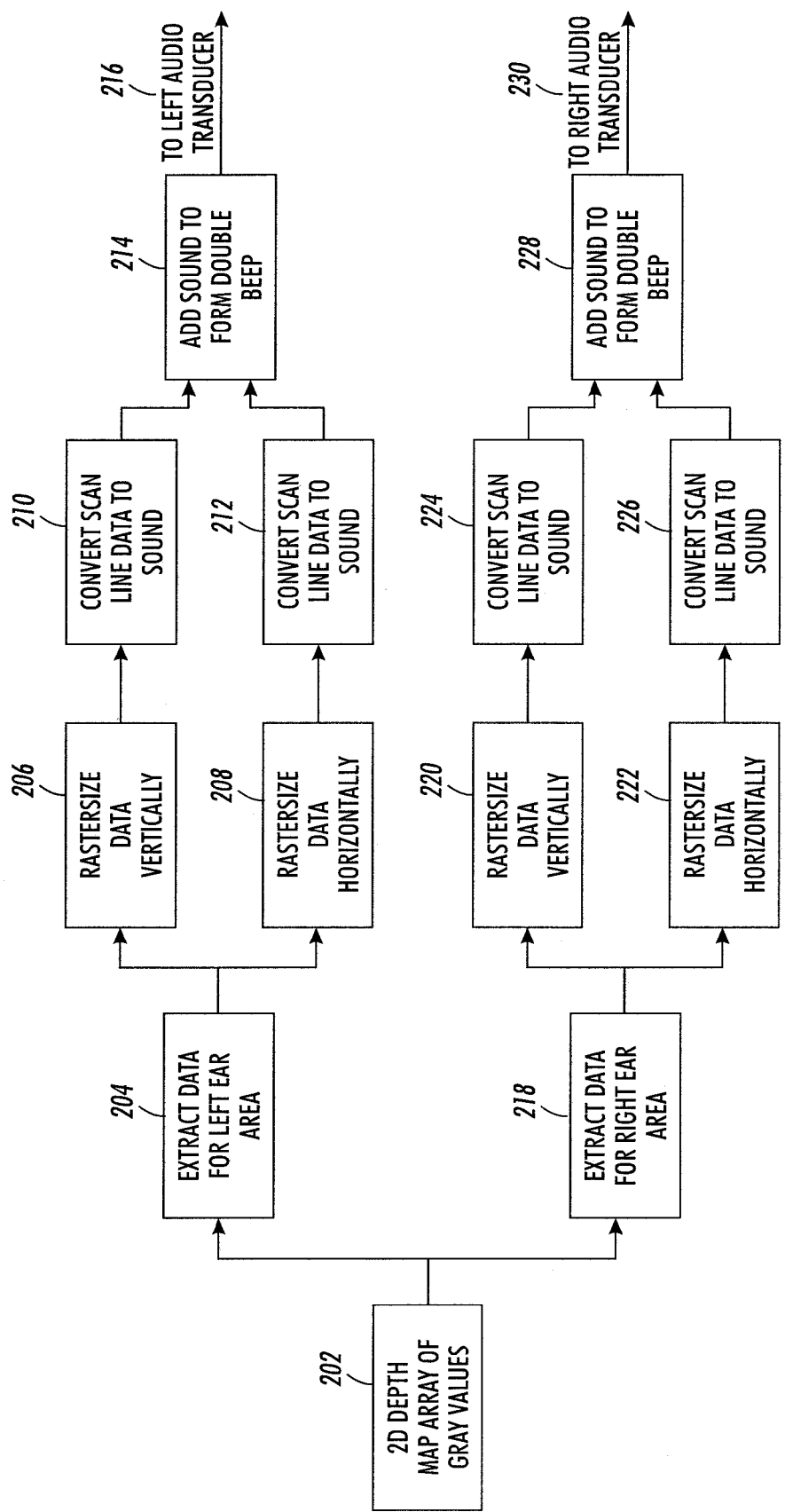
FIG. 2 illustrates a functional block diagram for the pair of glasses for dimensional proximity sensing.

FIG. 2 illustrates a functional block diagram for the pair of glasses 100. For example, a functional block 202 may receive a 2D depth map array of gray values. For example, the TOF camera 102 may receive a 3D depth map and the processor of the glasses 100 may convert the 3D depth map into the 2D depth map array of gray values.

In one embodiment, the 2D array of gray values may then be divided into a left portion, a center portion and a right portion, as discussed above. The left portion may be sent to a functional block 204 that extracts data for a left ear area and the right portion may be sent to a function block 218 that extracts data for a right ear area.

The data extracted for the left ear may be rasterized vertically by a functional block 206 and horizontally by a functional block 208. The vertically rasterized data may be sent to a functional block 210 to convert the scan line data to sound. The horizontally rasterized data may be sent to a functional block 212 to convert the scan line data to sound. At functional block 214, the sound from the vertical scan and the sound from the horizontal scan may be added to form a double beep. The double beep may be then sent to a left audio transducer (e.g., the left speaker 106) via output 216.

The data extracted for the right ear may be rasterized vertically by a functional block 220 and horizontally by a functional block 222. The vertically rasterized data may be sent to a functional block 224 to convert the scan line data to sound. The horizontally rasterized data may be sent to a functional block 226 to convert the scan line data to sound. At functional block 228, the sound from the vertical scan and the sound from the horizontal scan may be added to form a double beep. The double beep may be then sent to a right audio transducer (e.g., the right speaker 104) via output 230. In one embodiment, each one of the functional blocks 202-228 may be stored as instructions in memory and executed by a processor of the glasses 100.

Figure 4:
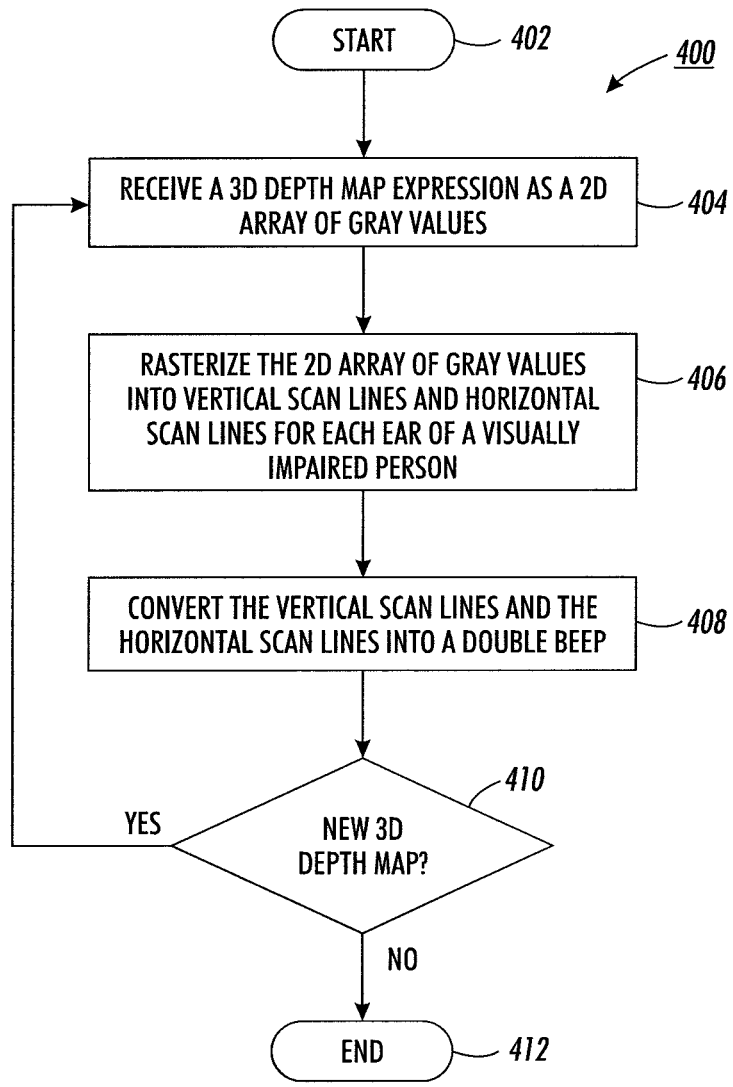
FIG. 4 illustrates an example flowchart of one embodiment of a method for providing a dimension and a proximity of an object to a visually impaired person.

FIG. 4 illustrates a flowchart of a method 400 for providing a dimension and a proximity of an object to a visually impaired person. In one embodiment, one or more steps or operations of the method 400 may be performed by the pair of glasses 100 or a general-purpose computer as illustrated in FIG. 5 and discussed below.

At step 402 the method 400 begins. At step 404, the method 400 receives a 3D depth map expressed as a 2D array of gray values. For example, a TOF camera on a pair of glasses may be used to capture the 3D depth map. The 3D depth map may then be converted into a 2D array of gray values. In one embodiment, the 3D depth map may be divided into a left portion, a center portion and a right portion. Each portion may then be converted into independent or separate 2D array of gray values representing a respective portion of the 3D depth map.

At step 406, the method 400 rasterizes the 2D array of gray values into vertical scan lines and horizontal scan lines for each ear of a visually impaired person. In other words, the 2D array of gray values is rasterized into vertical scan lines and horizontal scan lines for a left speaker and a right speaker of the pair of glasses. In one embodiment, the 2D array of gray values is created for a left portion and a right portion of an image. The 2D array of gray values for each respective portion may then be rasterized into vertical scan lines and horizontal scan lines. In one embodiment, the vertical scan lines and the horizontal scan lines may be rasterized separately.

At step 408, the method 400 converts the vertical scan lines and the horizontal scan lines into a double beep. For example, the 2D array of gray values may be converted into a 1D audio signal based on the vertical rasterization and the separate 1D audio signal based on the horizontal rasterization. Each frame of the 2D array of gray values may correspond to an audio signal on the 1D audio signal of the vertical rasterization and the horizontal rasterization. As a result, the corresponding audio signal for each frame (vertical and horizontal) may be played to the visually impaired person as a double beep. It should be noted that if no object is detected for a frame in one or more directions there could be a single beep for a frame (e.g., a silence followed by a beep, a beep followed by silence or complete silence).

As discussed above, the double beeps may provide various types of information to the visually impaired user. For example, the double beeps may provide proximity of an object, dimensions of the object, movement of the object, and the like.

At step 410, the method 400 determines if a new 3D depth map (e.g., a new frame) is received. For example, the visually impaired user may turn his or her head in either direction and a new 3D depth map may be captured by the TOF camera and processed by the glasses. If a new 3D depth map is received, the method 400 may return to step 404.

In one embodiment, the rasterizing and the converting may be continuously performed as new 3D depth maps are captured. For example, a series of consecutively 3D depth maps may be captured and continuously processed. Each one of the series of consecutively captured 3D depths maps may represent a particular instance of the object or a new object.

However, if no new 3D depth map is received (e.g., the glasses may be turned off), the method 400 may proceed to step 412. At step 412, the method 400 ends.

It should be noted that although not explicitly specified, one or more steps, functions, or operations of the method 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 4 that recite a determining operation, or involve a decision, do not necessarily require that both branches of the determining operation be practiced. In other words, one of the branches of the determining operation can be deemed as an optional step.

FIG. 5 depicts a high-level block diagram of a general-purpose computer suitable for use in performing the functions described herein. As depicted in FIG. 5, the system 500 comprises one or more hardware processor elements 502 (e.g., a central processing unit (CPU), a microprocessor, or a multi-core processor), a memory 504, e.g., random access memory (RAM) and/or read only memory (ROM), a module 505 for providing a dimension and a proximity of an object to a visually impaired person, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for providing a dimension and a proximity of an object to a visually impaired person (e.g., a software program comprising computer-executable instructions) can be loaded into memory 504 and executed by hardware processor element 502 to implement the steps, functions or operations as discussed above in connection with the exemplary method 400. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for providing a dimension and a proximity of an object to a visually impaired person (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for providing a dimension and a proximity of an object, comprising:
   receiving, by a processor, a three dimensional depth map expressed as a two dimensional array of gray values;
   rasterizing, by the processor, the two dimensional array of gray values into vertical scan lines and horizontal scan lines for a left speaker and a right speaker; and
   converting, by the processor, the vertical scan lines and the horizontal scan lines into a double beep, wherein a first beep of the double beep represents a vertical dimension of the object, the second beep of the double beep represents a horizontal dimension of the object, an intensity of each beep of the double beep represents the proximity of the object and a frequency spectrum of the double beep represents a shape of the object.

2. The method of claim 1, wherein the two dimensional array of gray values is divided into a left section, a center section and a right section and the rasterizing and the converting are performed for the left speaker on the left section and the right speaker on the right section.

3. The method of claim 2, wherein a left double beep in the left speaker represents a first object in the left section and a right double beep in the right speaker represents a second object in the right section.

4. The method of claim 1, wherein the rasterizing comprises:
   performing, by the processor, a first rasterization on the two dimensional array of gray values to obtain the vertical scan lines; and
   performing, by the processor, a second rasterization on the two dimensional array of gray values to obtain the horizontal scan lines.

5. The method of claim 1, wherein the object is a closest object in a field of view.

6. The method of claim 1, wherein the receiving, the rasterizing and the converting are continuously performed on a series of consecutively captured three dimensional depth maps, wherein each one of the series of consecutively captured three dimensional depths maps represents a particular instance of the object or a new object.

7. The method of claim 1, wherein the shape comprises a square shape, a rectangular shape, a pyramidal shape, a combination of shapes or a random shape.

8. The method of claim 1, wherein a change in the intensity of each beep of the double beep over a period of time while the a visually impaired person remains at a location represents a movement of the object.

9. A non-transitory computer-readable medium storing a plurality of instructions which, when executed by a processor, cause the processor to perform operations for providing a dimension and a proximity of an object, the operations comprising:
   receiving a three dimensional depth map expressed as a two dimensional array of gray values;

rasterizing the two dimensional array of gray values into vertical scan lines and horizontal scan lines for a left speaker and a right speaker; and converting the vertical scan lines and the horizontal scan lines into a double beep, wherein a first beep of the double beep represents a vertical dimension of the object, the second beep of the double beep represents a horizontal dimension of the object, an intensity of each beep of the double beep represents the proximity of the object and a frequency spectrum of the double beep represents a shape of the object.

10. The non-transitory computer-readable medium of claim 9, wherein the two dimensional array of gray values is divided into a left section, a center section and a right section and the rasterizing and the converting are performed for the left speaker on the left section and the right speaker on the right section.

11. The non-transitory computer-readable medium of claim 10, wherein a left double beep in the left speaker represents a first object in the left section and a right double beep in the right speaker represents a second object in the right section.

12. The non-transitory computer-readable medium of claim 9, wherein the rasterizing comprises:

performing a first rasterization on the two dimensional array of gray values to obtain the vertical scan lines; and performing a second rasterization on the two dimensional array of gray values to obtain the horizontal scan lines.

13. The non-transitory computer-readable medium of claim 9, wherein the object is a closest object in a field of view.

14. The non-transitory computer-readable medium of claim 9, wherein the receiving, the rasterizing and the converting are continuously performed on a series of consecutively captured three dimensional depth maps, wherein each one of the series of consecutively captured three dimensional depths maps represents a particular instance of the object or a new object.

15. The non-transitory computer-readable medium of claim 9, wherein the shape comprises a square shape, a rectangular shape, a pyramidal shape, a combination of shapes or a random shape.

16. The non-transitory computer-readable medium of claim 9, wherein a change in the intensity of each beep of the double beep over a period of time while a visually impaired person remains at a location represents a movement of the object.

17. A pair of glasses for providing a dimension and a proximity of an object comprising:

a time of flight camera for generating a three dimensional depth map;

a left speaker;

a right speaker; and a processor coupled to the time of flight camera for converting the three dimensional depth map into a two dimensional array of gray values, rasterizing the two dimensional array of gray values into vertical scan lines and horizontal scan lines for the left speaker and the right speaker and converting the vertical scan lines and the horizontal scan lines into a left side double beep outputted by the left speaker and a right side double beep outputted by the right speaker, wherein a first beep of the left side double beep and the right side double beep represents a vertical dimension of the object, the second beep of the left side double beep and the right side double beep represents a horizontal dimension of the object, an intensity of each beep of the left side double beep and the right side double beep represents the proximity of the object and a frequency spectrum of a series of left side double beeps and a series of right side double beeps represents a shape of the object.

18. The pair of glasses of claim 17, wherein the two dimensional array of gray values is divided into a left section, a center section and a right section and the rasterizing and the converting are performed for the left speaker on the left section and the right speaker on the right section, wherein the left side double beep represents a first object in the left section and the right side double beep represents a second object in the right section.

19. The pair of glasses of claim 17, wherein the left side double beep and the right side double beep are outputted simultaneously.

20. The pair of glasses of claim 17, wherein the rasterizing by the processor comprises a first rasterization on the two dimensional array of gray values to obtain the vertical scan lines and a second rasterization on the two dimensional array of gray values to obtain the horizontal scan lines.

* * * * *